April 9, 1929.  M. W. SEYMOUR  1,708,371
APPARATUS FOR PHOTOGRAPHIC COLOR PROCESS
Filed Aug. 22, 1927  3 Sheets-Sheet 2
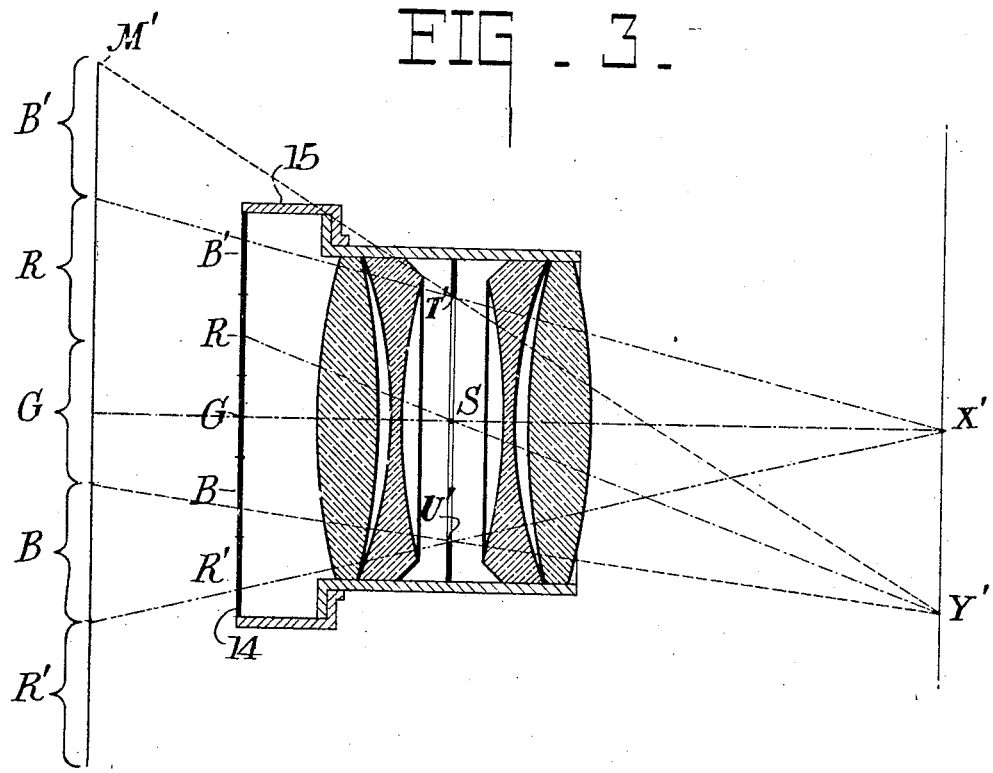
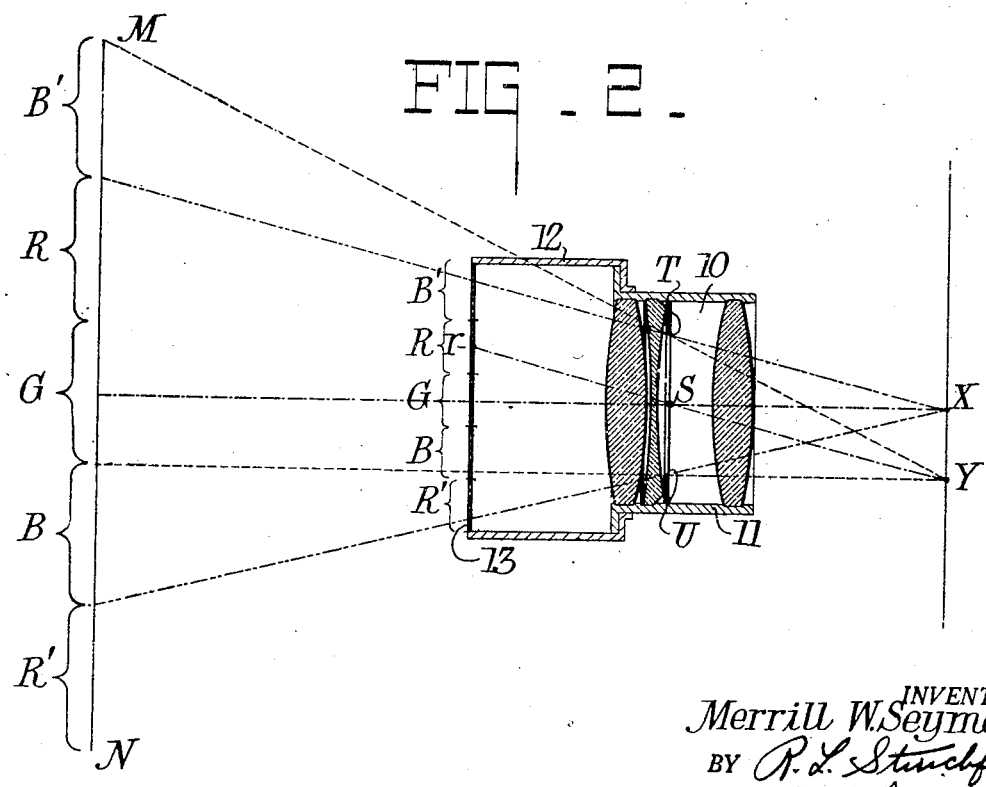
INVENTOR,
Merrill W. Seymour,
BY R. L. Stutchfield
N. M. Perrins
ATTORNEYS.

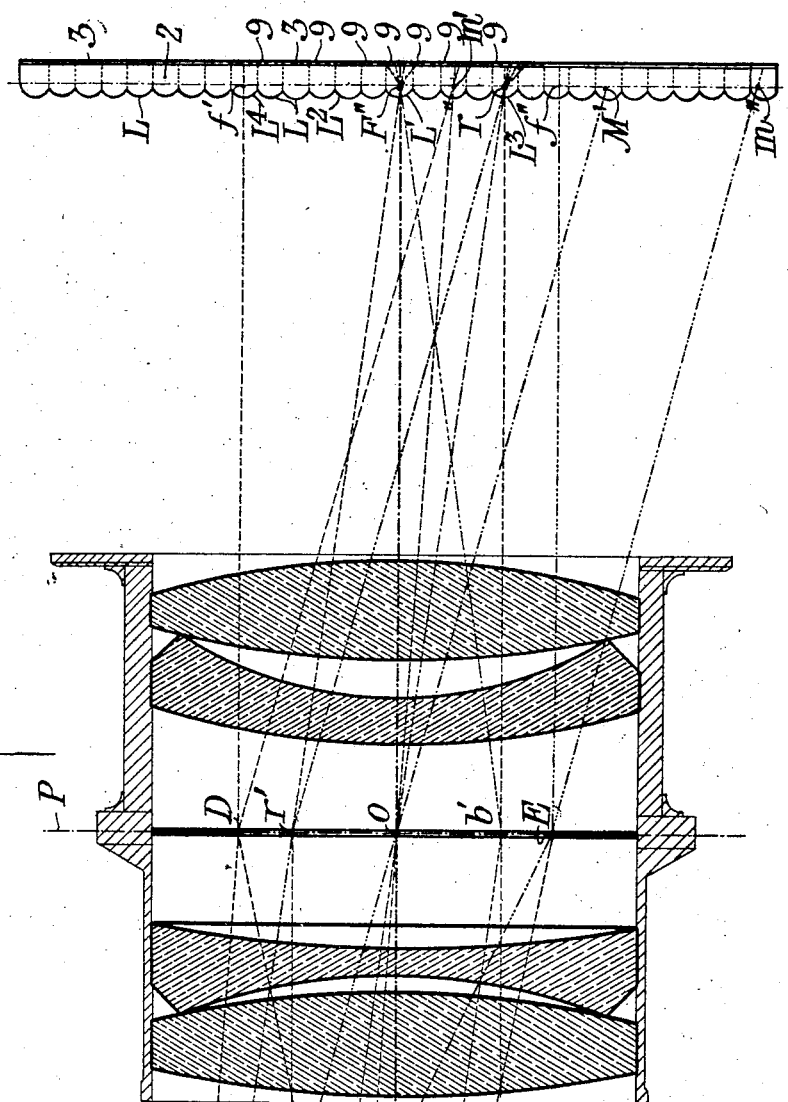

April 9, 1929.　　　M. W. SEYMOUR　　　1,708,371
APPARATUS FOR PHOTOGRAPHIC COLOR PROCESS
Filed Aug. 22, 1927　　　3 Sheets-Sheet 3
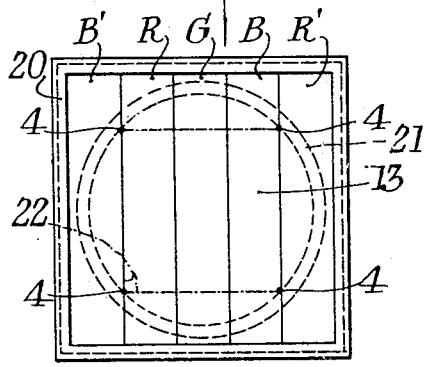
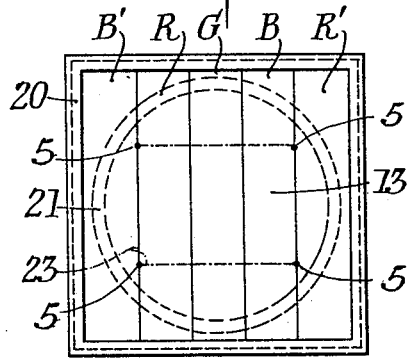
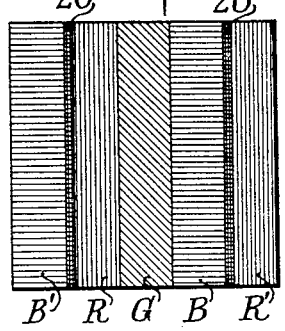
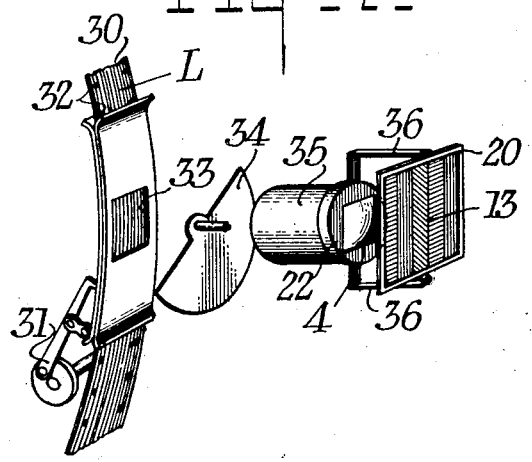
INVENTOR,
Merrill W. Seymour,
BY
ATTORNEYS.

Patented Apr. 9, 1929.

1,708,371

UNITED STATES PATENT OFFICE.

MERRILL W. SEYMOUR, OF ROCHESTER, NEW YORK, ASSIGNOR TO EASTMAN KODAK COMPANY, OF ROCHESTER, NEW YORK, A CORPORATION OF NEW YORK.

APPARATUS FOR PHOTOGRAPHIC COLOR PROCESS.

Application filed August 22, 1927. Serial No. 214,540.

This invention relates to a color process and particularly to an improvement in the process disclosed in the patent to Berthon, No. 992,151, granted May 16, 1911. More specifically it relates to optical systems for taking and projecting and having objectives of different focal lengths in which the polychromatic screen used for both taking and projecting may be positioned in front of the respective objectives without the necessity of using supplemental or collimating lenses. In certain aspects it may be considered a special case of the invention disclosed in the copending application of C. W. Frederick, Serial No. 207,213, filed July 20, 1927, which matured into Patent No. 1,685,600, granted September 25, 1928.

If the screen be placed in the front focal plane of the objective its virtual image will be at infinity but, if the objectives are of the same relative aperture in the two systems, the angle subtended at any point in the focal plane will be the same in each case. But from points off the axis the same filter area will not be visible. This can be overcome in the case of a banded filter by placing extra bands of color on each side of the filter.

For a fuller explanation of my invention, its objects and advantages reference will be made to the accompanying drawings wherein the same reference characters denote the same parts throughout and in which:

Fig. 1 is a diagram illustrative of a preferred form of my invention;

Fig. 2 is a diagram illustrative of a camera system embodying my invention;

Fig. 3 is a diagram of a projector system complementary to the camera system of Fig. 2;

Figs. 4 and 5 are front views of a filter mounted on an objective with different diaphragms;

Fig. 6 shows a modified screen; and

Fig. 7 is a perspective diagrammatic view of a motion picture camera system embodying my invention.

In the following discussion, for the sake of simplicity in explanation, an objective will be assumed to have a single optical center or plane, the position and relation of the two Gauss points being immaterial to an understanding of the invention.

In Fig. 1, which represents either a camera or projector system, O is the optical center of any lens or lens system, and lies in a plane P in which is the diaphragm of the objective, which limits the beam at the points D and E. The front and rear focal points are indicated at F' and F'' respectively. As shown, the diaphragm opening is half the focal length. Rays from any point on the front focal plane would emerge from the objective parallel to the line from such point to the point O. That is, rays F' D and F' E would proceed along the Df' and Ef'', parallel to F' OF'', and rays from any point M to D and E, would proceed along Dm' and Em'' parallel to MOM'. It is apparent that upon any point of the rear focal plane there would fall rays from an area of the front focal plane equal to the size of the diaphragm DE. Upon F'' there would fall rays from the area de equal to DE and indeed there would be focused on this point all rays such as dD, rr', F'O, bb' and eE, parallel to the axis. All rays parallel to rO, such as Mr', and F'b', would be focused at r''.

If at the front focal plane there is placed a screen having color bands G, R, B, preferably of equal width, that is, one third of D E, rays from this entire screen would fall only on the axial point F'', and at other points, the color rendering would be more or less defective. However, by extending the screen by bands of equal width there would be received at a point r'' on the rear focal plane rays through color bands of equal proportion, in this case G, R, and B'. At the point m', there would fall rays from a beam central at m through the bands R, G the upper half of B and the lower half of B'. At M' would fall rays through the bands R, B' and G'. There are here indicated, three identical green bands G, G' and G'', two red bands R and R' and two blue bands B and B'.

It is to be understood that this system is designed primarily for use with a special film here shown as a support 2 having on its front surface minute lenses L in the form of convex ridges and on its rear surface an image layer 3, which in the camera is photographically sensitive and in the projector carries a visible image. It is further understood that this visible image comprises a series of minute images of the color bands as made by the several lenses and corresponding in density to the intensity of the several colors of the subject at the particular point represented. The size and focal length of these minute lenses should be so designed that the image formed by any of them completely fills its image space in the photographic layer. As pointed out below, if the filter image does not fill the space, opaque areas should be included between the series.

A central lens element L' would form minute images symmetrical with it and directly behind it. The blue images are designated 9 and as every third image is blue, their relation to the lenses can be easily followed in the diagram. The lenses farther from the axis, such for instance as $L^2$ $L^3$ and $L^4$ would throw their images to one side of the position directly behind the particular lens. But in each case it would throw images of the color screens in their correct relation to the same or the next lens, so that the resulting image will be a series of minute bands, having the same relation to the minute lenses, so that it would be impossible by inspection to tell whether any particular minute image band were made by the minute lens directly in front of it or the adjacent one.

At points intermediate between L' and $L^3$, parts of the blue band image behind any lens element will be formed in part by the minute lens directly in front of it and in part by the adjacent lens. Obviously a film taken by this system can be projected with a lens of any focal length but of the same relative aperture having a color filter of the correct size in the front focal plane, or by any projection system having optical means for collimating the rays so that every lens forms an image directly behind it, one such system being shown in my copending application Serial No. 214,542, filed August 22, 1927.

It is to be understood that the thickness of the film is shown much exaggerated, and that it has been necessary to show the paths of the rays distorted.

The above, while a special case, has been outlined briefly as my preferred form and is simpler than the more general case which will now be briefly referred to.

In Fig. 2 is shown a camera objective 10 having the optical center S in the plane of the diaphragm TU carried in a mount 11 which supports by means of a cap 12, a screen 13 having five color bands, designated as in Fig. 1, of uniform width, one third of TU. From an axial point X in the rear focal plane the three central bands are visible and their virtual images will appear in the conjugate focal plane MN where they are similarly designated. From a point Y in line through the optical center with the middle point $r$ of the band R, the three bands G, R, and B' will be visible, and will appear as occupying the position of the similarly marked bands in the plane M, N. In this figure the actual paths of the rays through the several elements are not traced but only the effective entrance and emergent paths.

The resulting images are then projected through a complementary system shown in Fig. 3, having the optical center S, diaphragm T' U' and rear focal point X'. A screen 14, similar to those already described and having bands similarly designated, is carried by a support 15 at such a point that its virtual image occupies the plane M' N' distant from X' by the same distance as MN is distant from X. As fully explained in the Frederick application, correspondingly marked bands will appear the same from corresponding points of the two rear focal planes.

This is a particular application of the invention there disclosed, extending its useful range to wider angular fields than is usually possible with a screen of the size of the diaphragm, particularly when the camera objective is not particularly designed for the purpose. Referring to the theory discussed in the Frederick application and to Figs. 2 and 3 in the present case it is evident that as the screen in one system is moved forwardly, the screen in the complementary system must also be moved forwardly and that both approach, as limiting positions, the front focal points of the respective objectives. This is the case of my Fig. 1, which is therefore a special case of the Frederick invention.

In general use I find five color bands sufficient, and in order that the color ratio remain the same as to all points, these bands should be rectangular, the width of each band being one third its length. Referring to Fig. 4, there is shown a frame 20 carrying the screen 13 having the five transparent color bands B', R, G, B and R'. Behind this is the objective mount 21 having the diaphragm 22, having a square opening the corners of which are designated 4. The width of this opening should be the same as that of three bands but its height may vary in accordance with the invention described in my patent No. 1,689,258 granted Oct. 30, 1928 on my copending application Serial No. 214,541, filed Aug. 22, 1927. For instance, in Fig. 5 the same screen and lens are shown with a diaphragm 23 having the rectangular opening with its corners designated 4.

It is sometimes desirable for reason of color rendering that one of the color bands of the screen shall not fill its entire third of the diaphragm width. In this case corresponding duplicate color bands shall also be of reduced width and the unused space should be opaque. Such a screen is shown in Fig. 6, where the red band R is reduced in width and an opaque line 26 fills up the unused space. The duplicate band R' is also reduced and a similar line 26' used. Such a line should be used between successive series in any case where the filter image does not fill the minute field.

In Fig. 7 is shown diagrammatically a perspective sketch of a camera system embodying my invention. A film 30 having longitudinal ridges L and perforations 32 is drawn past a gate 33 by a pull-down mechanism indicated at 31 where it is exposed by shutter 34 operated in timed relation to the pulldown through an objective carried in mount 35, having the diaphragm 22 with the rectangular opening 4. Carried by suitable supports 36 is the frame 20 with screen 13.

It is obvious that variations are possible and I contemplate as included in my invention all such modifications and equivalents as fall within the scope of the appended claims.

Having thus described my invention what I claim as new and desire to secure by Letters Patent is:

1. An optical system for use in a color process utilizing an image layer with which is associated numerous microscopic, lineal, image-forming elements and comprising an objective, a diaphragm and a screen, the screen being situated in the front focal plane of the objective and comprising recurrent series of differently colored light transmitting bands.

2. An optical system for use in a color process utilizing an image layer with which is associated numerous microscopic, lineal, image-forming elements and comprising an objective, a diaphragm and a screen, the screen being situated in the front focal plane of the objective and comprising recurrent series of differently colored light transmitting bands, the width of one series of bands being the same as the width of the diaphragm of the objective.

3. An optical system for use in a color process utilizing an image layer with which is associated numerous, microscopic, lineal, image-forming elements and comprising an objective, a diaphragm associated with the objective and a screen, the screen being positioned in the front focal plane of the objective and comprising a series of differently colored, light transmitting, parallel bands the width of the series of bands being equal to the width of the diaphragm in the same direction, and additional bands identical with certain of the bands of said series and lying parallel thereto and constituting extensions of said series.

4. In combination, an image layer, numerous, microscopic, lineal image-forming elements associated with and in front of said layer, an objective focused on said layer, a rectangular diaphragm associated with said objective and having two of its edges parallel to the linear elements, and a screen situated in the front focal plane of the objective and comprising a series of differently colored, light transmitting bands parallel to said lineal elements, the width of the series being equal to the width of the diaphragm in the same direction and bands additional to said series similar to certain bands of said series and parallel thereto, constituting therewith a recurrent series of bands.

5. In combination, an image layer, numerous, microscopic, lineal image-forming elements associated with and in front of said layer, an objective focused on said layer, a rectangular diaphragm associated with said objective and having two of its edges parallel to the linear elements, and a screen situated in the front focal plane of the objective and comprising a series of differently colored, light transmitting bands parallel to said lineal elements, the width of the series being equal to the width of the diaphragm in the same direction and bands additional to said series similar to certain bands of said series and parallel thereto, constituting therewith a recurrent series of bands, the length of said bands being greater than the length of the diaphragm in the same direction.

6. A photographic optical system for use in the formation, in a photographic layer having associated therewith numerous microscopic image-forming elements, of minute photographic images for projection through a projection system comprising a projection objective and a polychromatic screen, the virtual image of which occupies an ascertained position with respect to the rear focal plane of such objective, said photographic optical system comprising a photographic objective of different focal length from the projection objective, and having a diaphragm of the same relative aperture as the projection objective, and a polychromatic screen similar to the first named screen and positioned in front of the photographic objective at that point which is conjugate to a point distant from the rear focal plane of the objective by the distance which the said virtual image in the projection system is distant from the rear focal plane of the projection objective, the screen comprising recurrent series of differently colored, light transmitting, parallel bands.

7. A photographic optical system for use in the formation, in a photographic layer having associated therewith numerous microscopic image-forming elements, of minute photographic images for projection through a projection system comprising a projection objective and a polychromatic screen, the virtual image of which occupies an ascertained position with respect to the rear focal plane of such objective, said photographic optical system comprising a photographic objective of different focal length from the projection objective, and having a diaphragm of the same relative aperture as the projection objective, and a polychromatic screen similar to the first named screen and positioned in front of the photographic objective at that point which is conjugate to a point distant from the rear focal plane of the objective by the distance which the said virtual image in the projection system is distant from the rear focal plane of the projection objective the screen comprising recurrent series of differently colored light-transmitting parallel bands, the width of one series being the same as the width of the diaphragm of the objective.

8. A photographic optical system for use in the formation, in a photographic layer having associated therewith numerous microscopic image-forming elements, of minute photographic images for projection through a projection system comprising a projection objective and a polychromatic screen, the virtual image of which occupies an ascertained position with respect to the rear focal plane of such objective, said photographic optical system comprising a photographic objective of different focal length from the projection objective, and having a diaphragm of the same relative aperture as the projection objective, and a polychromatic screen similar to the first named screen and positioned in front of the photographic objective at that point which is conjugate to a point distant from the rear focal plane of the objective by the distance which the said virtual image in the projection system is distant from the rear focal plane of the projection objective, the screen comprising a series of differently colored, light transmitting parallel bands, the width of the series being equal to the width of the diaphragm in the same direction, and additional bands identical with certain of said bands and lying parallel thereto and constituting recurring series therewith.

9. A photographic optical system for use in the formation, in a photographic layer having associated therewith numerous microscopic image-forming elements, of minute photographic images for projection through a projection system comprising a projection objective with a rectangular diaphragm and a polychromatic screen, the virtual image of which occupies an ascertained position with respect to the rear focal plane of such objective, said photographic optical system comprising a photographic objective of different focal length from the projection objective, a diaphragm having an opening of the same shape and relative aperture as that of the projection system and a polychromatic screen similar to the first named screen and positioned in front of the photographic objective at that point which is conjugate to a point distant from the rear focal plane of the objective by the distance which the said virtual image in the projection system is distant from the rear focal plane of the projection objective, the screen comprising a series of differently colored, light transmitting bands parallel to two sides of the diaphragm opening, the width of the series being equal to the distance between the said two sides and bands additional to said series similar to certain bands of said series and parallel thereto, constituting therewith a recurrent series of bands.

10. A photographic optical system for use in the formation, in a photographic layer having associated therewith numerous microscopic image-forming elements, of minute photographic images for projection through a projection system comprising a projection objective with a rectangular diaphragm and a polychromatic screen, the virutal image of which occupies an ascertained position with respect to the rear focal plane of such objective, said photographic optical system comprising a photographic objective of different focal length from the projection objective, a diaphragm having an opening the same shape and relative aperture as that of the projection system and a polychromatic screen similar to the first named screen and positioned in front of the photographic objective at that point which is conjugate to a point distant from the rear focal plane of the objective by the distance which the said virtual image in the projection system is distant from the rear focal plane of the projection objective, the screen comprising a series of differently colored, light transmitting bands parallel to two sides of the diaphragm opening, the width of the series being equal to the distance between the said two sides and bands additional to said series similar to certain bands of said series and parallel thereto, constituting therewith a recurrent series of bands the length of said bands being greater than the length of the diaphragm in the same direction.

Signed at Rochester, New York, this 17th day of August, 1927.

MERRILL W. SEYMOUR.